United States Patent
Whitt et al.

(12) 
(10) Patent No.: US 10,947,885 B2
(45) Date of Patent: Mar. 16, 2021

(54) PASSIVE NITRIC OXIDE STORAGE CATALYST MANAGEMENT

(71) Applicant: GM GLOBAL TECHNOLOGY OPERATIONS LLC, Detroit, MI (US)

(72) Inventors: Christopher L. Whitt, Howell, MI (US); Michael A. Smith, Clarkston, MI (US); Shouxian Ren, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 99 days.

(21) Appl. No.: 16/017,141

(22) Filed: Jun. 25, 2018

(65) Prior Publication Data

US 2019/0390589 A1 Dec. 26, 2019

(51) Int. Cl.
*F01N 9/00* (2006.01)
*F01N 3/08* (2006.01)
(Continued)

(52) U.S. Cl.
CPC ........... *F01N 9/005* (2013.01); *F01N 3/0814* (2013.01); *F01N 3/0842* (2013.01); *F01N 3/2066* (2013.01); *F02D 41/0245* (2013.01); *F01N 2570/14* (2013.01); *F01N 2610/02* (2013.01); *F01N 2900/0601* (2013.01); *F01N 2900/1402* (2013.01); *F01N 2900/1404* (2013.01); *F01N 2900/1411* (2013.01); *F02D 2200/0806* (2013.01)

(58) Field of Classification Search
CPC ............. F01N 2570/14; F01N 2610/02; F01N 2900/0601; F01N 2900/1402; F01N 2900/1404; F01N 2900/1411; F01N 3/0814; F01N 3/0842; F01N 3/2066; F01N 9/005; F02D 2200/0806; F02D 41/0245

See application file for complete search history.

(56) References Cited

U.S. PATENT DOCUMENTS

2009/0301067 A1* 12/2009 Dingle .................... F01N 3/021
 60/286
2011/0023462 A1* 2/2011 Kurtz ...................... F01N 3/035
 60/286

(Continued)

FOREIGN PATENT DOCUMENTS

CN 102852603 A 1/2013

OTHER PUBLICATIONS

Chinese office action for CN Application No. 201910454768.9; Report dated Jan. 6, 2021 (pp. 1-10).

*Primary Examiner* — Anthony Ayala Delgado
(74) *Attorney, Agent, or Firm* — Cantor Colburn LLP

(57) ABSTRACT

According to one or more embodiments described herein, an exhaust system for treating exhaust gas from an internal combustion engine in a motor vehicle includes a passive NOx absorber (PNA) device, and a model-based controller that controls an amount of NOx stored by the PNA device. Controlling of the amount of NOx stored includes computing a predicted NOx storage level of the PNA device using a prediction model of the PNA device, and in response to the predicted NOx storage level of the PNA device being greater than a predetermined cold-start threshold, raising a temperature of the exhaust gas by changing an operation of the internal combustion engine.

14 Claims, 2 Drawing Sheets

(51) Int. Cl.
    *F02D 41/02*         (2006.01)
    *F01N 3/20*          (2006.01)

(56)            References Cited

U.S. PATENT DOCUMENTS

2015/0033704 A1*  2/2015  Ardanese ................ F01N 9/007
                                                    60/274
2016/0024988 A1*  1/2016  Whitt ..................... F01N 11/00
                                                    423/212
2016/0032801 A1   2/2016  Alig et al.
2017/0226911 A1*  8/2017  Haas ..................... F01N 3/2053
2019/0293617 A1*  9/2019  Uchiyama ............. F01N 11/002

* cited by examiner

PASSIVE NITRIC OXIDE STORAGE CATALYST MANAGEMENT

INTRODUCTION

The present disclosure relates to exhaust systems for internal combustion engines, and more particularly to reducing oxides of nitrogen ("NOx") in exhaust gas.

Exhaust gas emitted from a lean-burn combustion engine, such as an internal combustion engine like a diesel engine, is a heterogeneous mixture that contains gaseous emissions such as carbon monoxide ("CO"), unburned hydrocarbons ("HC") and oxides of nitrogen ("NOx") including NO and NO2, as well as condensed phase materials (liquids and solids) that constitute particulate matter ("PM"). Catalyst compositions, typically disposed on catalyst supports or substrates, are provided in an engine exhaust system as part of an aftertreatment system to convert certain, or all of these exhaust constituents into non-regulated exhaust gas components. Because of future stringent emissions regulations, such as US Tier 3 and Europe EU 7 emissions regulations, significant interest has been focused on the reduction of nitric oxides (NOx) in the exhaust of a lean-burn combustion engine, such as a diesel engine, especially from engine cold start.

SUMMARY

According to one or more embodiments described herein, an exhaust system for treating exhaust gas from an internal combustion engine in a motor vehicle includes a passive NOx absorber (PNA) device, and a model-based controller that controls an amount of NOx stored by the PNA device. Controlling of the amount of NOx stored includes computing a predicted NOx storage level of the PNA device using a prediction model of the PNA device, and in response to the predicted NOx storage level of the PNA device being greater than a predetermined cold-start threshold, raising a temperature of the exhaust gas by changing an operation of the internal combustion engine.

In one or more examples, the predicted NOx storage level is computed based on a NOx concentration in the exhaust gas, an exhaust flow rate, and a temperature of the exhaust gas. Further, changing the operation of the internal combustion engine comprises changing at least one parameter of the internal combustion engine from a group of parameters consisting of quantity of fuel injection, timing of fuel injection, turbo charger air intake, and exhaust gas recirculation rate.

In one or more examples, the raised temperature causes the PNA device to release stored NOx, and the exhaust system further includes a NOx reduction device that converts the released NOx into nitrogen (N2) and/or water (H2O).

Controlling of the amount of NOx stored further includes computing a predicted conversion capacity of the NOx reduction device based on a prediction model of the NOx reduction device, and in response to the conversion capacity of the NOx reduction device being greater than a predetermined threshold value raising the temperature of the exhaust gas by changing the operation of the internal combustion engine.

In one or more examples, the exhaust system further includes a lean NOx trap (LNT) device that is downstream of the PNA device and upstream of the NOx reduction device.

In one or more examples, the NOx reduction device comprises a selective catalytic reduction device.

According to one or more embodiments, a vehicle system includes an internal combustion engine, a passive NOx absorber (PNA) device, and a model-based controller that controls an amount of NOx stored by the PNA device. Controlling of the amount of NOx stored includes computing a predicted NOx storage level of the PNA device using a prediction model of the PNA device, and in response to the predicted NOx storage level of the PNA device being greater than a predetermined cold-start threshold, raising a temperature of the exhaust gas by changing an operation of the internal combustion engine.

In one or more examples, the predicted NOx storage level is computed based on a NOx concentration in the exhaust gas, an exhaust flow rate, and a temperature of the exhaust gas. Further, changing the operation of the internal combustion engine comprises changing at least one parameter of the internal combustion engine from a group of parameters consisting of quantity of fuel injection, timing of fuel injection, turbo charger air intake, and exhaust gas recirculation rate.

In one or more examples, the raised temperature causes the PNA device to release stored NOx, and the exhaust system further includes a NOx reduction device that converts the released NOx into nitrogen (N2) and/or water (H2O).

Controlling of the amount of NOx stored further includes computing a predicted conversion capacity of the NOx reduction device based on a prediction model of the NOx reduction device, and in response to the conversion capacity of the NOx reduction device being greater than a predetermined threshold value raising the temperature of the exhaust gas by changing the operation of the internal combustion engine.

In one or more examples, the exhaust system further includes a lean NOx trap (LNT) device that is downstream of the PNA device and upstream of the NOx reduction device.

In one or more examples, the NOx reduction device comprises a selective catalytic reduction device.

According to one or more embodiments, a computer-implemented method for controlling an amount of NOx stored by a passive NOx absorber (PNA) device includes absorbing, by the PNA device, NOx from exhaust gas released by an internal combustion engine. The method further includes computing, by a controller, a predicted NOx storage level of the PNA device using a prediction model of the PNA device. The method further includes in response to the predicted NOx storage level of the PNA device being greater than a predetermined cold-start threshold, raising a temperature of the exhaust gas by changing, by the controller, an operation of the internal combustion engine.

In one or more examples, the predicted NOx storage level is computed based on a NOx concentration in the exhaust gas, an exhaust flow rate, and a temperature of the exhaust gas. Further, changing the operation of the internal combustion engine comprises changing at least one parameter of the internal combustion engine from a group of parameters consisting of quantity of fuel injection, timing of fuel injection, turbo charger air intake, and exhaust gas recirculation rate.

In one or more examples, the raised temperature causes the PNA device to release stored NOx, and the exhaust system further includes a NOx reduction device that converts the released NOx into nitrogen (N2) and/or water (H2O).

Controlling of the amount of NOx stored further includes computing a predicted conversion capacity of the NOx reduction device based on a prediction model of the NOx reduction device, and in response to the conversion capacity of the NOx reduction device being greater than a predetermined threshold value raising the temperature of the exhaust gas by changing the operation of the internal combustion engine.

In one or more examples, the exhaust system further includes a lean NOx trap (LNT) device that is downstream of the PNA device and upstream of the NOx reduction device.

In one or more examples, the NOx reduction device comprises a selective catalytic reduction device.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
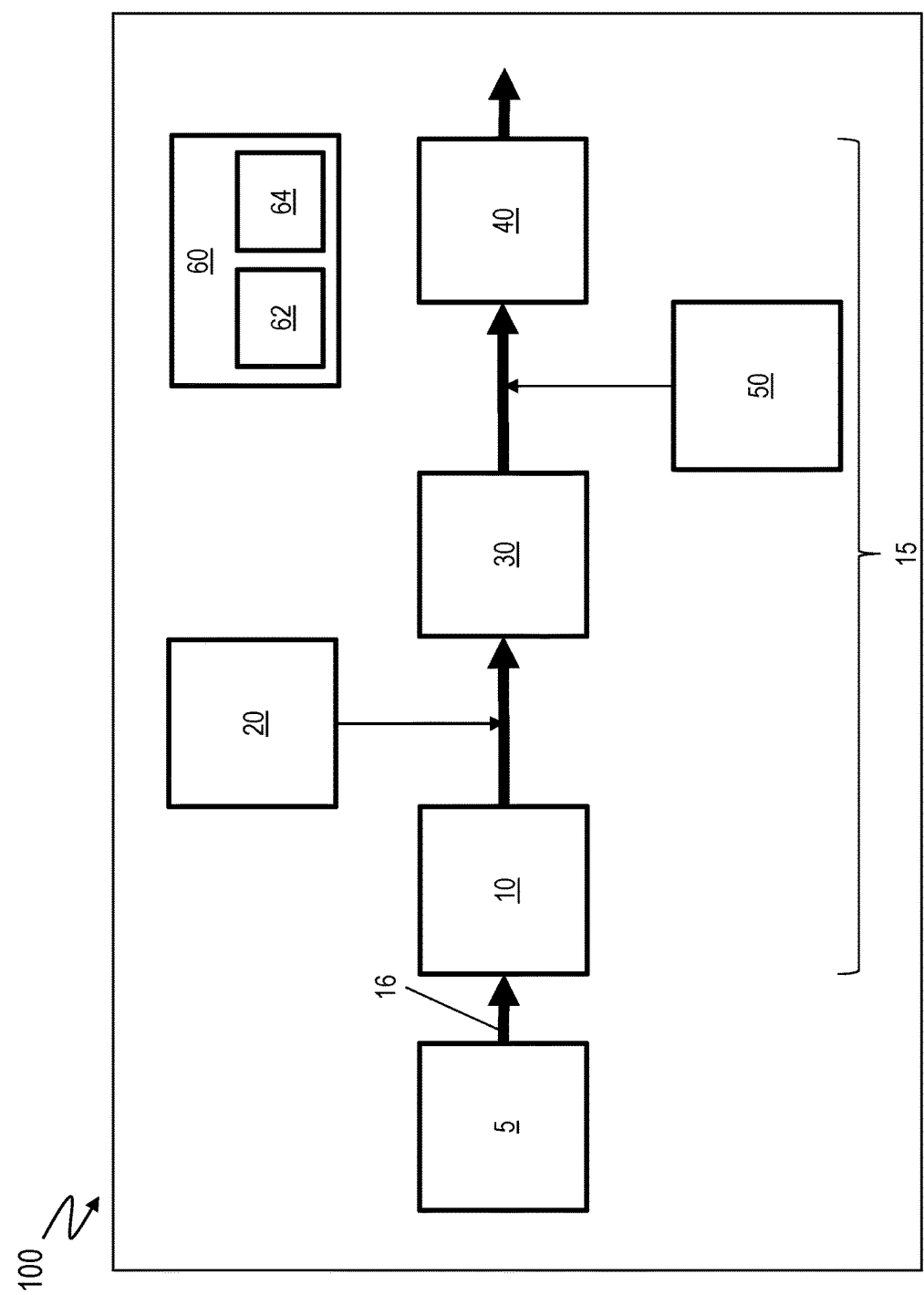
FIG. 1 is a generalized illustration of an engine and an associated exhaust system that is configured to treat the exhaust flow produced by the engine.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory module that executes one or more software or firmware programs, a combinational logic circuit, and/or other suitable components that provide the described functionality.

Treatment of exhaust gas from a lean combustion engine such as a diesel engine, involves various catalytic devices having one or more catalysts dispose on a substrate for reducing the levels of regulated constituents in exhaust. For example, diesel exhaust treatment systems may include an oxidation catalyst, also known as a diesel oxidation catalyst ("DOC"), and a passive NOx absorber catalyst ("PNA"), such as a diesel cold start catalyst ("dCSC"), that catalytically stores NOx from engine cold start. A PNA catalyst can also oxidize HC and CO to CO2 and water. Additionally, a selective catalytic reduction ("SCR") catalyst or a lean NOx trap (LNT) catalyst can reduce NOx to nitrogen (N2) and/or water (H2O) depending on the reductant. A diesel particulate filter ("DPF") can be used for removing particulates. In some instances, the SCR is combined with the DPF into a single unit usually referred to as an "SCRF".

Additionally, a lean NOx trap (LNT) [also known as a NOx storage reducing catalyst (NSC)] also facilitates reducing NOx in the exhaust gas. During normal operation, a lean burn engine produces an exhaust emission having a "lean" composition. An LNT is able to store or trap the nitrogen oxides (NOx) that are present in the "lean" exhaust emission. The LNT stores or traps the NOx present in the exhaust emissions through a chemical reaction between the NOx and a NOx storage component of the LNT to form an inorganic nitrate. The amount of NOx that can be stored by the LNT is limited by the amount of NOx storage component that is present. Eventually, the stored NOx from the NOx storage component of the LNT is released; ideally when a downstream SCR device has reached an effective operating temperature. Release of stored NOx from an LNT is typically achieved by running the lean burn engine under rich conditions to produce an exhaust emission having a "rich" composition. Typically, a rich fuel condition occurs when the air to fuel ratio is less than a predetermined ratio, for example, 14.7:1. The predetermined ratio is considered the perfect blend of air to fuel mixture or stoichiometric air fuel ratio. Under these conditions, the inorganic nitrates of the NOx storage component decompose to reform NOx. The step of releasing stored NOx from an LNT under rich exhaust gas conditions is known as purging or regenerating the LNT. A technical challenge of LNTs is that they tend to show poor NOx storage efficiency at low temperatures.

In one or more examples, PNAs are used to control exhaust NOx emissions from engine cold-start. PNAs involve catalytically-enhanced low temperature NOx storage; the stored NOx then thermally released once a downstream SCR or SCRF converter reaches a required operating temperature for effective NOx reduction. For example, PNAs are able to store or adsorb NOx at low exhaust gas temperatures (from room temperature to ~200° C.), usually by chemical adsorption, and release NOx at higher temperatures. Typical diesel exhaust management systems rely on both temperature and NOx concentration sensing to optimize the performance of a given exhaust treatment device. Such systems usually measure temperatures upstream and downstream of a PNA (or dCSC), as well as measuring NOx concentration in the exhaust stream upstream of the PNA (or dCSC) and downstream of the SCR (or SCRF).

A technical challenge with a PNA catalyst is that the PNA catalyst can only thermally release the stored NOx as the exhaust temperature reaches a release threshold. This can cause the PNA catalyst to be substantially full, that is having a NOx storage capacity below a particular threshold, at the end of a drive cycle and hence be incapable of further NOx storage during a next cold start event. The technical solutions described herein address such technical challenges by actively managing the NOx storage quantity of a PNA catalyst.

Figure 2:
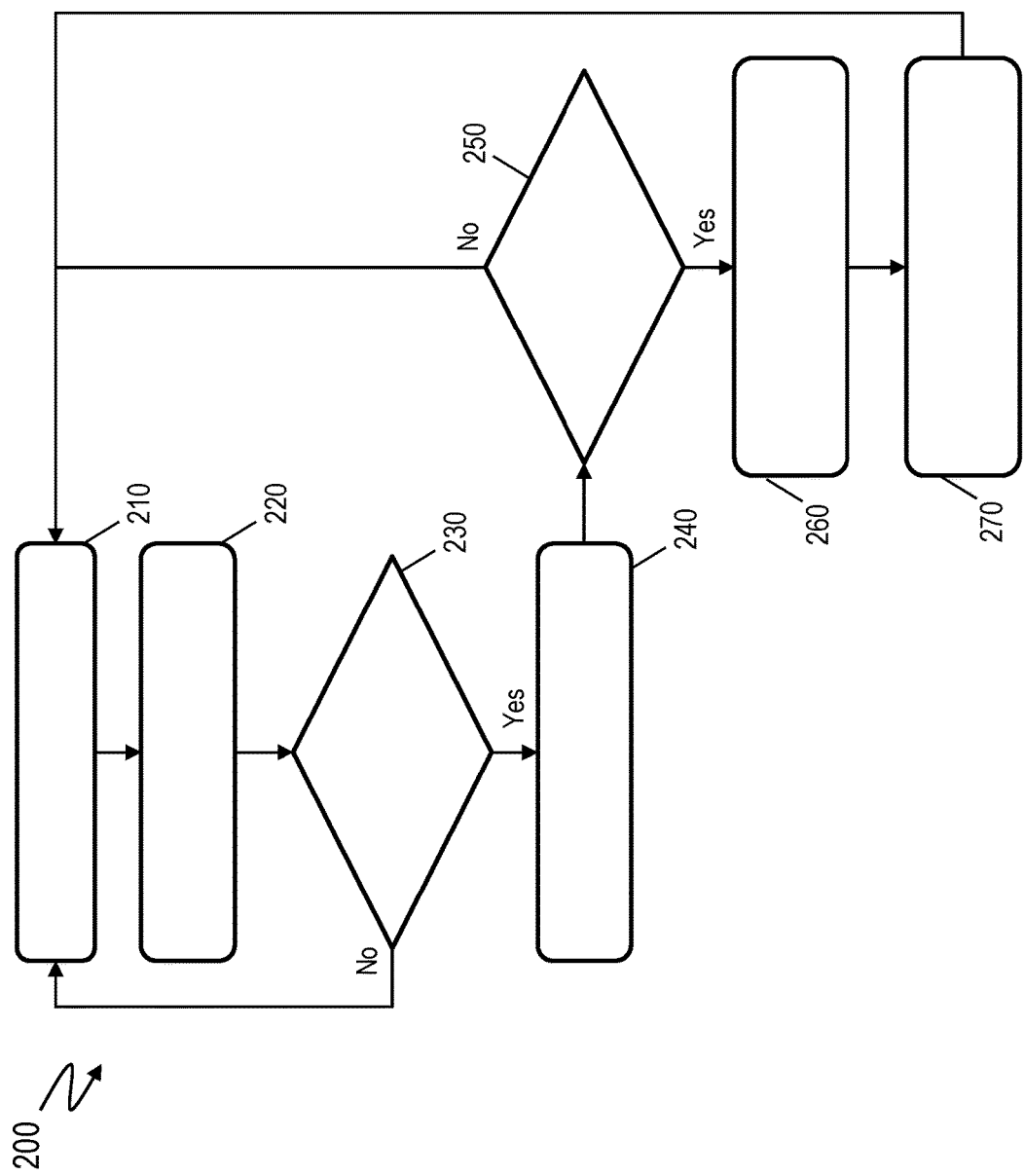
FIG. 2 depicts a flowchart of an example method for managing a NOx storage catalyst for controlling the NOx emissions of an exhaust system according to one or more embodiments.

FIGS. 1 and 2 are general representations of exhaust systems in accordance with the technical solutions described herein. In each of the Figures, the left hand side represents an inlet end of the exhaust treatment device and the right hand side represents an outlet end of the exhaust treatment device.

FIG. 1 shows a vehicle system 100 according to one or more embodiments. The vehicle system 100 includes an internal combustion engine 5 and an exhaust system 15. The exhaust system 15 includes a NOx absorber catalyst device 10, an HC injector 20, a NOx reduction device 30, a reductant injector 50, and an emissions control device 40. The internal combustion engine 5 can be a diesel engine or any other type of engine. The NOx absorber catalyst device 10 can be a PNA. The NOx reduction device 30 can be an LNT or any other such apparatus. The HC injector 20 introduces hydrocarbons into the exhaust gas 16 after it has passed through the NOx absorber catalyst device 10. The emissions control device 40 can be a selective catalytic reduction (SCR) device, or any other such apparatus. The reductant injector 50 is a reductant injector that injects a reductant such as urea, NH3, and the like. It should be noted that in one or more examples, the exhaust system 15 may include fewer or additional components. For example, in one or more examples the exhaust system includes PNA 10+SCR 40+DPF, PNA 10+SCRF 40, and PNA 10+DPF+ SCR 40, and other such combinations.

Exhaust gas 16 produced by the internal combustion engine 5 is contacted with the NOx absorber catalyst device 10. The exhaust gas 16 after the NOx absorber catalyst device 10 is contacted with the NOx reduction device 30. The injector 20 may introduce hydrocarbons into the exhaust gas 16 after it has passed through the NOx absorber catalyst device 10. The exhaust gas 16 from the NOx reduction device 30 is contacted with the emissions control device 40. The reductant injector 50 introduces a nitrogenous reductant into the exhaust gas 16 after it has passed through the NOx reduction device 30.

The vehicle system 100 further includes a control system 60. The control system 60 includes a controller 62 and one or more sensors 64. The controller 62 can be an electronic control unit (ECU) or any other type of processing circuit that includes one or more processors, a memory, and the like for executing one or more computer programming instructions. The one or more sensors 64 include a temperature sensor, a flow rate sensors, a pressure sensor, a NOx sensor, or any other type of sensor that measures one or more parameters of the exhaust gas 16 and or other components in the vehicle system 100. It should be noted that the block depicting the sensors 64 is illustrative and that the sensors 64 can be located at various positions in the vehicle system 100, such as at an inlet of a device, an outlet of a device, inside a device, and the like.

The controller 62 monitors the measurements from the one or more sensors 64. Based on the measurements, the controller 62 sends control instructions to one or more components of the vehicle system 100, such as the HC injector 20, the reductant injector 50, the internal combustion engine 5, and the like. For example, the controller 62 is coupled with the one or more components of the vehicle system 100 using a vehicle communication network, such as a controller area network (CAN) in a wired or wireless manner. The controller 62 sends control instructions to the internal combustion engine 5 to cause a change in the operation of the engine 5, which in turn changes a temperature of the internal combustion engine 5, the exhaust system 15, and/or the exhaust gas 16. For example, the controller 62 adjusts a fuel injection timing, an amount of air-fuel mixture injected, an idle speed, an exhaust gas recirculation (EGR) rate, turbo charger air intake, and other such parameters of the operation of the engine 5.

The controller 62 adjusts the operation of the engine 5 to change the operating temperature of the exhaust system 15 using a predetermined NOx storage model of the NOx absorber catalyst device 10 and a predetermined chemical model of the emissions control device 40. For example, equations (1)-(5) provide exemplary chemical reactions for NOx reduction by the emissions control device 40 in case of an SCR device.

$$6NO+4NH_3 \rightarrow 5N_2+6H_2O \tag{1}$$

$$4NO+4NH_3+O_2 \rightarrow 4N_2+6H_2O \tag{2}$$

$$6NO_2+8NH_3 \rightarrow 7N_2+12H_2O \tag{3}$$

$$2NO_2+4NH_3+O_2 \rightarrow 3N_2+6H_2O \tag{4}$$

$$NO+NO_2+2NH_3 \rightarrow 2N_2+3H_2O \tag{5}$$

It should be appreciated that Equations (1)-(5) are illustrative, and are not meant to confine the emissions control device 40 to a particular NOx reduction mechanism or mechanisms, nor preclude the operation of other devices. The emissions control device 40 can be configured to perform any one of the above NOx reduction reactions, combinations of the above NOx reduction reactions, and other NOx reduction reactions.

By monitoring the one or more sensor measurements and using the model of the emissions control device 40, the controller 62 can predict the amount of NOx reduced by the emissions control device 40, for example by converting the NOx into H2O or other components. The controller 62 can predict the NOx conversion capacity of the emissions control device 40 based on the prediction model. The NOx conversion can depend on operating parameters such as a flow rate of the exhaust gas 16, a temperature of the exhaust gas 16, a reductant injection rate of the reductant injector 50, an amount of NH3 stored in the emissions control device 40, and an amount of NOx in the exhaust gas 16. The controller can determine one or more of the operating parameters using the sensors 64.

Additionally, the controller 62 determines the amount of NOx in the exhaust gas 16 based on an amount of NOx stored in the NOx absorber catalyst device 10. The amount of NOx in NOx absorber catalyst device 10 is based on the predetermined model of the NOx absorber catalyst device 10. In one or more examples, the predetermined model is used to predict the amount of NOx stored in the NOx absorber catalyst device 10 using the operational parameters including the exhaust flow rate, the exhaust temperature, the input NOx to the NOx absorber catalyst device 10, and a maximum storage capacity of the NOx absorber catalyst device 10.

FIG. 2 depicts a flowchart of an example method 200 for managing the NOx absorber catalyst device 10 (PNA) for controlling the NOx emission of the exhaust system 15 according to one or more embodiments. The method 200 includes the controller 62 reading sensor measurements from the sensors 64, at 210. The method further includes computing a predicted NOx storage level of the NOx absorber catalyst device 10 using the prediction model and the sensor measurements, at 220. The storage level of the NOx absorber catalyst device 10 is indicative of an amount of NOx absorbed.

The storage level is compared with a cold-start threshold value, at 230. The cold-start threshold value is a predetermined value that can be calibrated. The cold-start threshold value is a desired amount of stored NOx that allows additional NOx from the exhaust gas 16 to be absorbed by the NOx absorber catalyst device 10 at cold-start temperature. As described herein, the stored NOx is then released at a higher temperature of the exhaust gas 16, the higher temperature lighting-off or activating the emission reduction device 40, such as the SCR, to reduce the released NOx. If the predicted storage level of the NOx absorber catalyst device 10 is less than (or equal to) the cold-start threshold value, the controller 62 continues the operation of the internal combustion engine 5 as is, without any adjustments, and continues to monitor the sensor measurements, at 210.

If the predicted storage level of the NOx absorber catalyst device 10 is greater than (or equal to) the cold-start threshold value, the method 200 includes evaluating NOx conversion capacity of the emissions control device 40 based on the predicted amount of NOx in the exhaust gas 16, at 240. The amount of NOx in the exhaust gas 16 can be predicted based on the predicted storage level of the NOx absorber catalyst device 10 and the sensor measurements. The predicted NOx conversion capacity of the emissions control device 40 is determined using the prediction model of the emissions control device 40 and the measured/predicted parameters from sensors 64. The controller 62 determines a predicted NOx release level of the emissions control device 40 according to the prediction model using the predicted amount of NOx in the exhaust gas and the one or more parameters at the cold-start temperature.

As the storage level in the NOx absorber catalyst device 10 increases, the amount of NOx that reaches the emissions control device 40 increases. Because the emissions control device 40 may not reduce all of the NOx, particularly at the cold-start (lower) temperature, the controller checks if a predicted NOx release level of the emissions control device 40 is below a predetermined NOx release threshold value. The NOx release threshold value is indicative of an amount of NOx that the emissions control device 40 can emit in compliance with a release threshold value of NOx, such as based on local regulations, standards etc.

In one or more examples, a difference between the release threshold value and the predicted NOx release value is a conversion capacity of the emissions control device 40. Alternatively, or in addition, the conversion capacity of the emission control device 40 is a function of the difference between the release threshold value and the predicted NOx release value. The conversion capacity is indicative of an amount of NOx that the emissions control device 40 can additionally convert and yet maintain the exhaust system 15 in compliance with a release threshold value of NOx.

The method 200 further includes comparing the predicted NOx conversion capacity of the emissions control device 40 with a predetermined threshold, at 250. The threshold is a predetermined value that can be calibrated. If the predetermined threshold associated with the conversion capacity of the emissions control device 40 is not being surpassed, the controller 62 can continue the operation of the internal combustion engine 5 as is, without any adjustments, at 210. The method 200 includes continuing the monitoring of the sensor measurements and compliance of the exhaust system 15 in such a case, at 250, and repeating the method, at 210.

Alternatively, if the predicted NOx conversion capacity is greater than (or equal to) the threshold conversion capacity, the method includes determining an exhaust gas temperature that will cause the NOx absorber catalyst device 10 to release additional NOx to meet the conversion capacity of the emissions control device 40, at 260. The controller 62 determines the exhaust temperature based on the prediction model of the emission reduction device 40 and by using the conversion capacity of the emissions control device 40 as an input value for reverse calculating the exhaust temperature. Alternatively, or in addition, the controller 42 uses a look-up table to determine the temperature based on the computed conversion capacity, the look-up table providing conversion capacity values and corresponding exhaust gas temperature values.

The method 200 includes adjusting the operation of the internal combustion engine 5 to raise the temperature of the exhaust gas 16 to the determined temperature, at 270. Adjusting the engine operation can include changing fuel injection rate, air-fuel mixture, idle speed, and other such parameters of the operation of the internal combustion engine 5. Such alterations to the operation causes the combustion temperature of the internal combustion engine 5 to rise, and in turn the temperature of the exhaust gas 16 to rise.

As the combustion temperature rises, the NOx absorber catalyst device 10 releases stored NOx, which is converted and reduced by the emissions control device 40.

The technical solutions described herein, accordingly facilitate managing the passive NOx absorber catalyst device 10 in a repeatable manner. The technical solutions described herein monitors the NOx storage level of the NOx absorber catalyst device 10 and maintains an available storage capacity by actively raising the exhaust temperature when the emissions control device 40 has a capacity to convert the released NOx. Accordingly, the technical solutions described herein, by causing the exhaust gas temperature to rise, ensures that the NOx absorber catalyst device 10 has storage capacity available to absorb any NOx that may be released during a next engine cold start.

The technical solutions described herein facilitate improvements to emissions control systems used with internal combustion engines, such as those used in vehicles. For example, the technical solutions provide a control strategy that optimizes the overall performance of the exhaust gas treatment system composed of an emissions control device 40 and a NOx absorber catalyst device 10 to maintain tailpipe NOx emissions within a predetermined range, and by altering engine operations to maintain a storage level and/or storage capacity level of the NOx absorber catalyst device 10. The technical solutions described herein accordingly optimize the performance of the exhaust system 15.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. An exhaust system for treating exhaust gas from an internal combustion engine in a motor vehicle, the exhaust system comprising:
a passive NOx absorber (PNA) device; and
a model-based controller that is configured to control an amount of NOx stored by the PNA device, the controlling of the amount of NOx stored comprising:
computing a predicted NOx storage level of the PNA device using a prediction model of the PNA device; and
in response to the predicted NOx storage level of the PNA device being greater than a predetermined cold-start threshold, raising a temperature of the exhaust gas by changing an operation of the internal combustion engine, wherein the raised temperature causes the PNA device to release stored NOx;
an emissions reduction device that converts the released NOx into nitrogen (N2) and/or water (H2O), wherein a predicted conversion capacity of the emissions reduction device is computed using a prediction model of the emissions reduction device and is based on a predicted amount of NOx in the exhaust gas, wherein in response to the conversion capacity of the emissions reduction device being greater than a predetermined threshold value, raising the temperature of the exhaust gas by changing the operation of the internal combustion engine.

2. The exhaust system of claim 1, wherein the predicted NOx storage level is computed based on a NOx concentration in the exhaust gas, an exhaust flow rate, and the temperature of the exhaust gas.

3. The exhaust system of claim 1, wherein changing the operation of the internal combustion engine comprises changing at least one parameter of the internal combustion engine from a group of parameters consisting of quantity of fuel injection, timing of fuel injection, turbo charger air intake, and exhaust gas recirculation rate.

4. The exhaust system of claim 1, further comprising:
a NOx reduction device that is downstream of the PNA device and upstream of the emissions reduction device.

5. The exhaust system of claim 1, wherein the emissions reduction device comprises a selective catalytic reduction device.

6. A vehicle system comprising:
an internal combustion engine;
a passive NOx absorber (PNA) device; and
a model-based controller that is configured to control an amount of NOx stored by the PNA device, the controlling of the amount of NOx stored comprising:
computing a predicted NOx storage level of the PNA device using a prediction model of the PNA device; and
in response to the predicted NOx storage level of the PNA device being greater than a predetermined cold-start threshold, raising a temperature of exhaust gas from the internal combustion engine by changing an operation of the internal combustion engine, wherein the raised temperature causes the PNA device to release stored NOx;
an emissions reduction device that converts the released NOx into nitrogen (N2) and/or water (H2O), wherein a predicted conversion capacity of the emissions reduction device is computed using a prediction model of the emissions reduction device and is based on a predicted amount of NOx in the exhaust gas, wherein in response to the conversion capacity of the emissions reduction device being greater than a predetermined threshold value raising the temperature of the exhaust gas by changing the operation of the internal combustion engine.

7. The vehicle system of claim 6, wherein the predicted NOx storage level is computed based on the temperature of the exhaust gas.

8. The vehicle system of claim 6, wherein changing the operation of the internal combustion engine comprises changing at least one parameter of the internal combustion engine from a group of parameters consisting of quantity of fuel injection, timing of fuel injection, turbo charger air intake, and exhaust gas recirculation rate.

9. The vehicle system of claim 6, further comprises:
a NOx reduction device that is downstream of the PNA device and upstream of the emissions reduction device.

10. The vehicle system of claim 6, wherein the emissions reduction device comprises a selective catalytic reduction device.

11. A computer-implemented method for controlling an amount of NOx stored by a passive NOx absorber (PNA) device, the method comprising:
absorbing, by the PNA device, NOx from exhaust gas released by an internal combustion engine;
computing, by a controller, a predicted NOx storage level of the PNA device using a prediction model of the PNA device; and
in response to the predicted NOx storage level of the PNA device being greater than a predetermined cold-start threshold, raising a temperature of the exhaust gas by changing, by the controller, an operation of the internal combustion engine, wherein the raised temperature causes the PNA device to release stored NOx;
converting, by an emissions reduction device, the released NOx into nitrogen (N2) and/or water (H2O), wherein a predicted conversion capacity of the emissions reduction device is computed using a prediction model of the emissions reduction device and is based on a predicted amount of NOx in the exhaust gas, wherein in response to the conversion capacity of the emissions reduction device being greater than a predetermined threshold value raising the temperature of the exhaust gas by changing the operation of the internal combustion engine.

12. The method of claim 11, wherein the predicted NOx storage level is computed based on the temperature of the exhaust gas.

13. The method of claim 11, wherein changing the operation of the internal combustion engine comprises changing at least one parameter of the internal combustion engine from a group of parameters consisting of quantity of fuel injection, timing of fuel injection, turbo charger air intake, and exhaust gas recirculation rate.

14. The method of claim 11, wherein the emissions reduction device comprises a selective catalytic reduction device.

* * * * *